3,219,665
2-ARYL-4,6,7-TRIAMINOPTERIDINES

Joseph Weinstock, Phoenixville, Pa., assignor to Smith Kline & French Laboratories, Philadelphia, Pa., a corporation of Pennsylvania
No Drawing. Filed June 4, 1963, Ser. No. 285,232
3 Claims. (Cl. 260—251.5)

This invention relates to novel 2-aryl-4,6,7-triaminopteridines which have useful diuretic and hypotensive activity. More specifically this invention relates to 2-phenyl- and 2-thienyl-4,6,7-triaminopteridines of the following general structural formula:

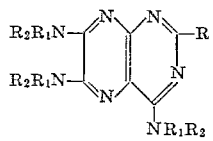

in which:

R represents phenyl or thienyl; and
$R_1$ and $R_2$ represent hydrogen or lower alkyl, preferably from 1 to 3 carbon atoms.

The triaminopteridines of this invention are especially useful diuretic and hypotensive agents by virtue of their excellent natruretic and chloruretic activity accompanied by only a slight increase in the rate of potassium excretion. In addition, the triaminopteridines of this invention are particularly advantageous due to their lack of antifolic acid activity.

The 2-aryl-4,6,7-triaminopteridines of Formula I are prepared according to the following reaction steps:

(a) Condensing a 2-aryl-4-hydroxy-5,6-diaminopyrimidine and oxalic acid or its ethyl or methyl ester, in an aqueous or aqueous acetic acid medium, or ethylene glycol or ethoxyethanol, by refluxing for from one to three hours to give the 2-aryl-4,6,7-trihydroxypteridine;

(b) Reacting the trihydroxypteridine with phosphorus oxychloride and phosphorus pentachloride to give the 2-aryl-4,6,7-trichloropteridine; and (c) Reacting the trichloropteridine with ammonia or a mono- or di-lower alkylamine.

The pyrimidine starting materials are prepared by methods known to the art. Thus, an aryl amidine is condensed with ethyl cyanoacetate to give the 2-aryl-4-hydroxy-6-aminopyrimidine which is coupled with phenyldiazonium chloride to give the 5-phenylazo derivative followed by reduction to the 2-aryl-4-hydroxy-5,6-diaminopyrimidine.

The reaction of the trichloropteridines to give the triaminopteridine products may be carried out in the presence of or without solvents. Preferably, the reaction with ammonia is carried out in the absence of solvents by heating in a closed pressure tube (bomb). The reaction with the mono- or di-lower alkylamine may be carried out similarly in a closed pressure tube, preferably with a solvent such as methyl or ethyl alcohol, or other suitable solvents which do not enter into the reaction.

By exploiting the reactivities of the chlorine atoms in the 2-aryl-4,6,7-trichloropteridine, the 6- and 7-chlorine atoms may be replaced by an amino group by reaction with ammonia or an amine at a temperature up to approximately 100° C. At higher temperatures, up to approximately 200° C., the 4-chlorine atom is replaced by an amino group.

The following examples will illustrate methods of preparing the compounds of this invention as outlined above. However, they are not to be construed as limiting the invention herein claimed. Further, it is obvious that modification of these methods will occur to those skilled in this art.

Example 1

4,6,7-trihydroxy-2-phenylpteridine (26.5 g.) is refluxed for five hours with 300 ml. of phosphorus oxychloride and 104 g. of phosphorus pentachloride. The reaction mixture is treated carefully with ether, then the ether extract is treated with charcoal and filtered. The filtrate is concentrated and cooled to give a solid which is sublimed at 187–189° C. to give 2-phenyl-4,6,7-trichloropteridine, M.P. 193–195° C.

The trichloropteridine (0.40 g.) in 50 ml. of liquid ammonia is heated in a bomb at 140° C. for six hours. The solid residue is treated with ethanol and the insoluble material filtered. The alcohol filtrate is evaporated in vacuo and the residue is dissolved in dilute hydrochloric acid, filtered and precipitated at pH 8 with concentrated ammonium hydroxide. The solid is recrystallized from water to give 2-phenyl-4,6,7-triaminopteridine, M.P. 285–287° C. (dec.).

Example 2

Following the general procedure outlined in Chemical Abstracts, vol. 47, column 12396, 0.1 mole of 2-thienylamidine is condensed with ethyl cyanoacetate to give 2-(2-thienyl)-4-hydroxy-6-aminopyrimidine which is condensed with phenyldiazonium chloride to give the 5-phenylazo derivative followed by reduction to 2-(2-thienyl)-4-hydroxy-5,6-diaminopyrimidine. The 2-(2-thienyl)-pyrimidine (0.1 mole) is refluxed with 0.11 mole of oxalic acid in water for two hours to give 2-(2-thienyl)-4,6,7-trihydroxypteridine.

Similarly, following the procedure of Example 1, the trihydroxypteridine is converted by reaction with phosphorus oxychloride and phosphorus pentachloride to the corresponding 4,6,7-trichloropteridine which is reacted with ammonia to give upon workup, 2-(2-thienyl)-4,6,7-triaminopteridine.

Example 3

2-phenyl-4,6,7-trichloropteridine (8.0 g., 0.02 mole) is heated with 75 ml. of a solution of methylamine in absolute alcohol (about 25%) at about 140° C. for four hours in a bomb. The reaction mixture is treated with water to give the 2-phenyl-4,6,7-tri-(methylamino)-pteridine which is purified by recrystallization.

Similarly, 0.02 mole of 2-phenyl- or 2-(2-thienyl)-4,6,7-trichloropteridine is reacted with dimethylamine, ethylamine, diethylamine or isopropylamine to give the corresponding 4,6,7-trisubstituted aminopteridines.

Example 4

2-phenyl-4,6,7-trichloropteridine (8.0 g.) is heated with 50 ml. of a solution of dimethylamine in absolute methanol at reflux for fiive hours. The reaction mixture is concentrated and cooled to give 2-phenyl-4-chloro-6,7-di-(dimethylamino)-pteridine.

Reaction of the latter 4-chloropteridine (0.2 g.) in 25 ml. of liquid ammonia at 140° C. in a bomb for six hours as described in Example 1, yields upon workup 2-phenyl-4-amino-6,7-di-(dimethylamino)-pteridine.

Example 5

2-phenyl-4,6,7-trichloropteridine (0.30 g.) in 30 ml. of liquid ammonia is heated in a bomb at 50° C. for six hours and worked up as in Example 1 to give 2-phenyl-4-chloro-6,7-diaminopteridine.

Reaction of this 4-chloropteridine (0.2 g.) in 25 ml. of a solution of isopropylamine in isopropanol at 140° C. for five hours in a bomb gives upon treatment with water 2-phenyl-4-isopropylamino-6,7-diaminopteridine.

What is claimed is:

1. A chemical compound of the formula:

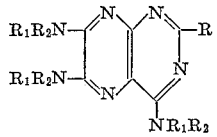

in which:

R is a member selected from the group consisting of phenyl and thienyl; and $R_1$ and $R_2$ are members selected from the group consisting of hydrogen and lower alkyl of from 1 to 3 carbon atoms.

2. A chemical compound of the formula:

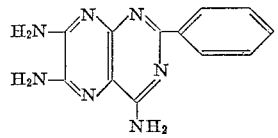

3. A chemical compound of the formula:

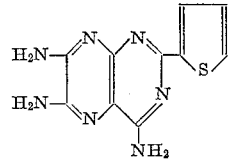

References Cited by the Examiner

Spickett et al., J. Chem. Soc., London (1954), pages 2887–95.

NICHOLAS S. RIZZO, *Primary Examiner.*